United States Patent Office 3,170,925
Patented Feb. 23, 1965

3,170,925
1-SUBSTITUTED 4,6-DIAMINO-1,2-DIHYDRO-2,2-DIMETHYL-s-TRIAZINE COMPOUNDS
Leonard Doub, Bloomfield Hills, Mich., assignor to Parke, Davis & Company, Detroit, Mich., a corporation of Michigan
No Drawing. Continuation of application Ser. No. 118,787, June 22, 1961. This application Nov. 8, 1963, Ser. No. 322,504
5 Claims. (Cl. 260—249.9)

This invention relates to dihydrotriazines, to acid-addition salts thereof, and to methods for their production. More particularly, the invention relates to dihydrotriazines which in free base form have the formula

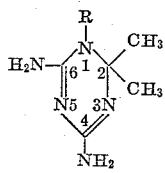

wherein R represents an alkyl group, either straight chain or branched, of 2 to 12 carbon atoms inclusive substituted by a cycloalkyl group containing from 5 to 7 carbon atoms inclusive; an alkenyl group containing from 3 to 5 carbon atoms inclusive substituted by chlorine; an alkoxyalkyl group containing from 3 to 6 carbon atoms inclusive; and a phenoxyalkyl group, said group containing from 3 to 6 carbon atoms inclusive in its alkyl portion.

The free bases of the invention form acid-addition salts by reaction with any number of acids. Non-toxic, pharmaceutically - acceptable acid-addition salts are formed with acids such as hydrochloric, hydrobromic, hydriodic, sulfuric, phosphoric, acetic, citric, tartaric, and p-toluenesulfonic acids. These acid-addition salts are converted to the free bases by treatment with a base such as sodium hydroxide or sodium carbonate.

In accordance with the invention, compounds of the above formula can be prepared by reacting a biguanide of the formula

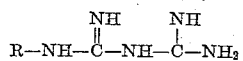

with acetone, in the presence of at least one equivalent of an acid; wherein R is as defined above. An excess of acid and acetone are normally employed, acetone serving as a solvent for the reaction. In case the reactants are not fully soluble in acetone, additional solvents such as the lower alkanols, especially ethanol, may be used. The reaction is preferably carried out by heating the mixture at 50 to 100° C. or at the reflux temperature of the reaction mixture for from four to sixty-four hours. Satisfactory results can also be obtained by using reaction times and temperatures somewhat outside of this range—as for example, by carrying out the reaction at room temperature for periods of up to five days. Following the above procedure the product is isolated directly as an acid-addition salt or, following treatment with a base, as the free base.

The biguanides used in the above-described process can be prepared by reacting an amine salt of the formula

with dicyandiamide; wherein R is as defined above and A is an anion of an acid, preferably a mineral acid such as hydrochloric acid.

The compounds of this invention possess valuable antibacterial, antimalarial, and antiviral activity. For example, they show a high degree of activity against *Streptococcus pyogenes* and are active against viral infections such as herpes and measles, as well as being effective for combating the plasmodia of malaria. They can be administered either orally or parenterally. Interestingly, the antibacterial activity of these compounds makes them useful as sterilizing agents for glassware and other laboratory equipment. Further, topical application is also available to combat against surface bacterial infections. Since the free triazines are sometimes relatively unstable and have a tendency to rearrange, they are preferably prepared and administered as acid-addition salts.

Several sub-groups within the generic disclosure of this invention are of particular importance because of the high-level activity which the particular compounds within each group exhibit in one or more of the various fields of utility described above.

One group of dihydrotriazines which is of particular importance to this invention includes those compounds wherein the 1-substituent on the dihydrotriazine ring is an alkoxyalkyl radical of 3 to 6 carbon atoms inclusive. These compounds show particular utility as antiviral agents.

A second preferred sub-group contains those dihydrotriazines wherein the 1-position holds a phenoxyalkyl group, said group containing from 3 to 6 carbon atoms in its alkyl portion. These compounds are particularly useful as antibacterial and antiviral agents. The lowest member of the series, namely, 4,6-diamino-1,2-dihydro-2,2-dimethyl-1-(3-phenoxypropyl)-s-triazine, monohydrochloride is of particular interest because of its high degree of antiviral activity against herpes.

The invention is illustrated, but not limited, by the following examples:

*Example 1*

To a refluxing suspension of 12.39 g. 1-[2-(cyclohexylethyl)]-biguanide hydrochloride in 750 ml. reagent grade acetone is added 1.0 ml. concentrated hydrochloric acid and sufficient absolute ethanol to obtain a homogeneous solution. This solution is refluxed for sixteen hours and then concentrated to dryness in vacuo below 60° C. The syrupy solid which remains is triturated with cold acetone and the solid 4,6-diamino-1-(2-cyclohexylethyl)-1,2-dihydro-2,2-dimethyl-s - triazine, monohydrochloride thus obtained is removed, washed with acetone, then with dry ether, and dried in vacuo at 60° C. for twelve hours; M.P. 232–233° C. (with decomposition) after recrystallization from absolute methanol.

If 1-[8-(cyclohexyloctyl)]-biguanide hydrochloride or 1-[10-(cyclohexyldecyl)]-biguanide hydrochloride (0.05 mol., prepared by the following reaction of the corresponding amine and dicyandiamide) is used in place of the 1-[2-(cyclohexylethyl)]-biguanide hydrochloride in the above reaction, the product isolated will be the monohydrochloride salt of 4,6-diamino-1-(8-cyclohexloctyl)-1,2-dihydro-2,2-dimethyl-s-triazine or 4,6-diamino-1-(10-cyclohexyldecyl)-1,2-dihydro-2,2-dimethyl-s-triazine, respectively.

The 1-[2-(cyclohexylethyl)]-biguanide hydrochloride used in the above reaction is prepared as follows: A mixture of 49.1 g. cyclohexylethylamine hydrochloride, 25.2 g. dicyandiamide, and 500 ml. chlorobenzene is refluxed for seven hours and then allowed to stand overnight. The chlorobenzene is distilled off and the residue dissolved in warm isopropanol, treated with charcoal, filtered, cooled, and anhydrous ether added. The 1 - [2-(cyclohexylethyl)]-biguanide hydrochloride which precipitates is dried for twenty hours at 60° C./27 mm. Hg; M.P. 125–130° C. after successive recrystallizations from chloroform and isopropanol.

Example 2

To a refluxing suspension of 47.49 g. 1-(3-isopropoxypropyl)-biguanide hydrochloride in 1200 ml. reagent grade acetone is added 4.0 ml. concentrated hydrochloric acid and a minimum of absoblute ethanol to dissolve the biguanide. The resulting solution is refluxed for six and one-half hours at 60° C. (or alternatively stirred for sixteen hours at 25° C.) and then concentrated to dryness in vacuo below 60° C. The semi-solid which remains is triturated with cold acetone and the solid 4,6-diamino - 1,2 - dihydro-1-(3-isopropoxypropyl)-2,2-dimethyl-s-striazine, monohydrochloride thus obtained is collected, washed with acetone, then dry ether, and dried in vacuo at 60° C. for ten hours; M.P. 207–208° C. (with decomposition) after recrystallization from propanol.

The 1-(3-isopropoxypropyl)-biguanide hydrochloride used in the above reaction is prepared as follows: A mixture of 117.2 g. 3-isopropoxypropylamine, 85 ml. concentrated hydrochloric acid, and 84.0 g. dicyandiamide in 500 ml. chlorobenzene is refluxed and stirred for six and one-half hours. The solution is then concentrated to dryness on a steam bath at 14 mm. Hg. Addition of ethanol causes the syrupy residue to crystallize. The solid 1-(3-isopropoxypropyl)-biguanide hydrochloride is collected, washed with ether, and dried for sixteen hours at 70° C./27 mm. Hg. Recrystallization from absolute ethanol, followed by washing with anhydrous ether, and drying for 60 hours at 60° C./27 mm. gave the product; M.P. 141–143° C.

Example 3

To a refluxing suspension of 41.94 g. 3-methoxypropyl biguanide hydrochloride in 1200 ml. reagent grade acetone is added 3.42 ml. concentrated hydrochloric acid and 800 ml. absolute ethanol. This mixture is refluxed for six and one-half hours, allowed to stand overnight at room temperature, and then concentrated to dryness in vacuo below 60° C. The solid 4,6-diamino-1,2-dihydro-2,2-dimethyl-1-(3-methoxypropyl)-s-triazine, monohydrochloride which remains is washed with acetone, then dry ether, and dried in vacuo at 60° C. for twelve hours; M.P. 209–210° C. (with decomposition) after recrystallization from absolute ethanol.

If 39.1 g. 2-methoxyethyl biguanide hydrochloride is used in place of the 41.94 g. of 3-methoxypropyl biguanide hydrochloride in the above reaction, the product obtained will be 4,6-diamino-1,2-dihyro-1-(2-methoxyethyl)-2,2-dimethyl-s-triazine, monohydrochloride.

If 44.7 g. of 3-ethoxypropyl biguanide hydrochloride is used in place of the 41.94 g. of 3-methoxypropyl biguanide hydrochloride in the above reaction, the product obtained will be 4,6-diamino-1,2-dihydro-1-(3-ethoxypropyl)-2,2-dimethyl-s-triazine, monohydrochloride.

Example 4

To a refluxing suspension of 15.81 g. of 3-chloro-2-butenyl biguanide hydrochloride in 300 ml. reagent grade acetone is added 1.4 ml. concentrated hydrochloric acid and sufficient absolute ethanol to produce a homogeneous solution. The solution is refluxed for four and one-half hours and then concentrated to dryness in vacuo. The semi-solid residue which remains is triturated with cold acetone and the solid 4,6-diamino-1-(3-chloro-2-butenyl)-1,2-dihydro-2,2-dimethyl-s-triazine, monohydrochloride thus obtained is collected, washed with acetone, then with dry ether, and dried in vacuo at 60° C. for thirteen hours; M.P. 232–233° C. (with decomposition) after recrystallization from ethanol.

The 3-chloro-2-butenyl biguanide hydrochloride used in the above reaction is prepared as follows: Hexamethylenetetramine (140.0 g.) and 150 g. sodium iodide are dissolved in 1 liter of water at room temperature. To this solution is added 125.0 g. 1,3-dichloro-2-butene. Precipitation begins almost immediately. The reaction mixture is allowed to stand overnight, the complex filtered, washed with ethanol, and air dried. The solid is suspended in one liter of methanol, anhydrous hydrogen chloride is added, and the mixture distilled below 60° C. When no more distillate can be collected below 60° C., the addition of hydrogen chloride is stopped and the methanol is evaporated to one quarter of its volume. The solution is then cooled and the solid 3-chloro-2-butenylamine hydrochloride is collected, washed with acetone, and recrystallized from isopropanol. It has M.P. 213–215° C. A mixture of 28.41 g. 3-chloro-2-butenylamine hydrochloride and 16.8 g. dicyandiamide is refluxed with stirring in 500 ml. chlorobenzene for seven hours and then allowed to stand overnight at room temperature. The solid 3-chloro-2-butenyl biguanide hydrochloride is filtered from the cold solution and recrystallized from isopropanol after washing with ether and drying at 60° C./27 mm. for sixty-four hours. The 3-chloro-2-butenyl biguanide hydrochloride has M.P. 162–165° C. (with decomposition).

Example 5

To 6.78 g. 3-phenoxypropyl biguanide hydrochloride suspended in 250 ml. refluxing reagent grade acetone is added 0.52 ml. concentrated hydrochloric acid and sufficient absolute ethanol to dissolve the biguanide hydrochloride. This solution is refluxed for nine hours (alteratively the solution can be stirred at 25° C. for sixteen hours) and then concentrated to dryness in vacuo below 60° C. to leave a syrupy solid which is then triturated with cold acetone. The resulting solid 4,6-diamino-1,2-dihydro 2,2-dimethyl-1-(3-phenoxypropyl)-s-triazine, monohydrochloride is collected, washed with acetone, then with dry ether, and dried in vacuo for eleven hours at 60° C.; M.P. 223–224° C. (with decomposition) after recrystallization from absolute ethanol.

If 7.13 g. of 4-phenoxybutyl biguanide hydrochloride is used in place of the 6.78 g. of 3-phenoxypropyl biguanide hydrochloride in the above reaction, the product isolated will be 4,6-diamino-1,2-dihydro-2,2-dimethyl-1-(4-phenoxybutyl)-s-triazine, monohydrochloride.

If 7.49 g. of 5-phenoxypentyl biguanide hydrochloride is used in place of the 6.78 g. of 3-phenoxypropyl biguanide hydrochloride in the above reaction, the product isolated will be 4,6-diamino-1,2-dihydro-2,2-dimethyl-1-(5-phenoxypentyl)-s-triazine, monohydrochloride.

If 7.83 g. of 6-phenoxyhexyl biguanide hydrochloride is used in place of the 6.78 g. of 3-phenoxypropyl biguanide hydrochloride in the above reaction, the product isolated will be 4,6-diamino-1,2-dihydro-2,2-dimethyl-1-(6-phenoxyhexyl)-s-triazine, monohydrochloride.

A solution of 2.26 g. of 4,6-diamino-1,2-dihydro-2,2-dimethyl-1-(3-phenoxypropyl)-s-triazine, monohydrochloride in a minimum of distilled water is cooled in an ice bath and N sodium hydroxide is added until the hydrochloride has been neutralized. The solid 4,6-diamino-1,2-dihydro - 2,2 - dimethyl - 1 - (3-phenoxypropyl)-s-triazine which precipitates can then be collected and dried.

A suspension of 1.2 g. of 4,6-diamino-1,2-dihydro-2,2-dimethyl-1-(3-phenoxypropyl)-s-triazine in 5 ml. distilled water is neutralized to pH 6 with 0.2 M sulfuric acid. The 4,6 - diamino - 1,2-dihydro-2,2-dimethyl-1-(3-phenoxypropyl)-s-triazine sulfate which remains after evaporation of the solution to dryness is crystallized from ethanol-water, collected, and dried. This salt gives pH 6 on wet indicator paper.

A suspension of 1.2 g. 4,6-diamino-1,2-dihydro-2,2-dimethyl-1-(3-phenoxypropyl)-s-triazine in 5 ml. distilled water is neutralized to pH 6 with 0.1 M phosphoric acid. The 4,6-diamino-1,2-dihydro-2,2-dimethyl-1-(3-phenoxypropyl)-s-triazine phosphate which remains after evaporation of the solution to dryness is crystallized from ethanol, collected, and dried. This salt gives pH 6 on wet indicator paper.

A suspension of 1.2 g. 4,6-diamino-1,2-dihydro-2,2-dimethyl-1-(3-phenoxypropyl)-s-triazine in 5 ml. distilled water is neutralized to pH 6 with 0.1 N acetic acid. The 4,6 - diamino - 1,2-dihydro-2,2-dimethyl-1-(3-phenoxypropyl)-s-triazine acetate which remains after evaporation of the solution to dryness is crystallized from acetone, collected, and dried. This salt gives pH 6 on wet indicator paper.

This application is a continuation of my copending application Ser. No. 118,787, filed June 22, 1961, now abandoned.

I claim:
1. A member of the class consisting of a free base and pharmaceutically-acceptable acid-addition salts thereof, said free base having the formula

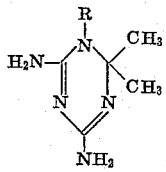

wherein R is a member of the class consisting of
alkyl of $C_2$ to $C_{12}$ inclusive substituted by cycloalkyl of $C_5$ to $C_7$ inclusive;
monochloroalkenyl of $C_3$ to $C_5$ inclusive;
alkoxyalkyl of $C_3$ to $C_6$ inclusive; and
phenoxyalkyl containing 3 to 6 carbon atoms in its alkyl portion.

2. 4,6 - diamino-1-(2-cyclohexylethyl)-1,2-dihydro-2,2-dimethyl-s-triazine, monohydrochloride.
3. 4,6 - diamino-1,2-dihydro-1-(3-isopropoxypropyl)-2,2-dimethyl-s-triazine, monohydrochloride.
4. 4,6 - diamino - 1,2 - dihydro-2,2-dimethyl-1-(3-phenoxypropyl)-s-triazine.
5. 4,6 - diamino - 1 - (3-chloro-2-butenyl)-1,2-dihydro-2,2-dimethyl-s-triazine, monohydrochloride.

References Cited in the file of this patent
UNITED STATES PATENTS

| | | |
|---|---|---|
| 2,515,116 | Dudley | July 11, 1950 |
| 2,714,057 | Chenicek | Apr. 13, 1955 |
| 2,734,807 | Chenicek et al. | Feb. 14, 1956 |
| 2,803,628 | Crowther | Aug. 20, 1957 |
| 2,900,385 | Modest | Aug. 18, 1959 |

OTHER REFERENCES

Modest et al.: Journ. of the Am. Chem. Soc., vol. 74 (1952), pp. 855–856.

Birtwell: Journ. of the Chem. Soc. (London), April 1952, pp. 1279–1286.

Smolin et al.: "S-Triazines and Derivatives," Interscience Pub. Inc., New York, 1959, pp. 258–63.